(12) United States Patent
Zheng et al.

(10) Patent No.: US 7,936,808 B2
(45) Date of Patent: May 3, 2011

(54) CHANNEL QUANTIZATION FOR MULTIUSER DIVERSITY

(75) Inventors: Jun Zheng, La Jolla, CA (US);
Chengjin Zhang, La Jolla, CA (US);
Pieter Van Rooyen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1349 days.

(21) Appl. No.: 11/231,416

(22) Filed: Sep. 21, 2005

(65) Prior Publication Data

US 2007/0064780 A1    Mar. 22, 2007

(51) Int. Cl.
*H04L 5/16*    (2006.01)
(52) U.S. Cl. .................. 375/220; 375/346; 375/219
(58) Field of Classification Search .......... 375/220, 375/346, 260, 219; 455/69
See application file for complete search history.

(56) References Cited

U.S. PATENT DOCUMENTS

| | | | | |
|---|---|---|---|---|
| 6,898,250 | B2 * | 5/2005 | Lee et al. ............ | 375/267 |
| 7,139,328 | B2 * | 11/2006 | Thomas et al. ........ | 375/299 |
| 7,573,952 | B1 * | 8/2009 | Thampy et al. ....... | 375/316 |
| 2005/0182807 | A1 * | 8/2005 | Ramaswamy et al. .. | 708/420 |
| 2005/0265223 | A1 * | 12/2005 | Song .................... | 370/208 |

FOREIGN PATENT DOCUMENTS

EP    1265389 A2 *    12/2002

OTHER PUBLICATIONS

T. Yoo and A. J. Goldsmith, "Capacity And Power Allocation For Fading MIMO Channels With Channel Estimation Error," Submitted To IEEE Transaction On Information Theory, vol. 52, No. 5, May 2006.
J. Proakis, *Digital Communications*, 3rd Ed. New York: the Mcgraw-Hill Companies, Inc., 1995, pp. 777-795.
R. Knopp and P. A. Humblet, "Information Capacity and Power Control In Single-Cell Multiuser Communications," in *IEEE International Conference on Communications* 1995, vol. 1, Seattle, 1995, pp. 331-335. 13.
K. N. Lau, Y. Liu, and T. A. Chen, "On The Design of Mimo Block-Fading Channels With Feedback-Link Capacity Constraint," *IEEE Trans.* On communications, vol. 52, No. 1, pp. 62-70, Jan. 2004.
D. J. Love, R. W. Heath, Jr., and T. Strohmer, "Grassmannian Beamforming for Multiple-Input Multiple-Output Wireless Systems," *IEEE Trans.* On information theory, vol, 49, pp. 2735-2747, Oct. 2003.

(Continued)

*Primary Examiner* — Shuwang Liu
*Assistant Examiner* — Helene Tayong
(74) *Attorney, Agent, or Firm* — McAndrews, Held & Malloy, Ltd.

(57) ABSTRACT

A method and system for channel quantization for multiuser diversity are provided. A quantizer may utilize quantization levels determined based on an objective function J that corresponds to a performance metric for a finite-rate feedback multiuser downlink communication system. The quantization levels may be obtained based on the results of maximizing the objective function J by means of an optimization algorithm. The optimization algorithm may be a multivariate optimization algorithm that may be implemented utilizing an iterative approach. The quantizer may utilize the quantization levels to quantize channel state information (CSI) to achieve multiuser diversity in the finite-rate feedback multiuser system. The performance metric may be based on signal-to-noise ratio (SNR), bit error rate (BER), and/or system capacity. The quantization levels may be utilized in a multiuser system where distributed quantization is needed for optimal selection.

20 Claims, 7 Drawing Sheets

OTHER PUBLICATIONS

J. C. Roh and B. D. Rao, "Design and Analysis Of Mimo Spatial Multiplexing Systems With Quantized Feedback," *submitted to IEEE Trans*. On signal processing, 2005.

P. Xia and G. B. Giannakis, "Design and Analysis Of Transmit-Beamforming Based on Limited-Rate Feedback," *IEEE Trans*. On signal processing, 2005 (to appear).

D. Gesbert and M. S. Alouini, "How Much Feedback Is Multi-User Diversity Really Worth?" In IEEE International Conference on Communications 2004, vol. 1, 2004, pp. 234-238.

S. Sanayei and A. Nosratinia, "Exploiting Multiuser Diversity With Only 1-Bit Feedback," in IEEE Wireless Communications and Networking Conference 2005, vol. 2, Seattle, 2005, pp. 978-983.

\* cited by examiner

CHANNEL QUANTIZATION FOR MULTIUSER DIVERSITY

CROSS-REFERENCE TO RELATED APPLICATIONS/INCORPORATION BY REFERENCE

This application makes reference to:
U.S. application Ser. No. 11/232,340 filed Sep. 21, 2005;
U.S. application Ser. No. 11/232,266 filed Sep. 21, 2005, issued as U.S. Pat. No. 7,630,337 on Dec. 8, 2009;
U.S. application Ser. No. 11/231,501 filed Sep. 21, 2005;
U.S. application Ser. No. 11/231,699 filed Sep. 21, 2005;
U.S. application Ser. No. 11/231,586 filed Sep. 21, 2005;
U.S. application Ser. No. 11/232,369 filed Sep. 21, 2005, issued as U.S. Pat. No. 7,636,553 on Dec. 22, 2009;
U.S. application Ser. No. 11/231,701 filed Sep. 21, 2005;
U.S. application Ser. No. 11/232,362 filed Sep. 21, 2005, issued as U.S. Pat. No. 7,515,878 on Apr. 7, 2009; and
U.S. application Ser. No. 11/231,557 filed Sep. 21, 2005.

Each of the above stated applications is hereby incorporated by reference in its entirety.

FIELD OF THE INVENTION

Certain embodiments of the invention relate to wireless communications. More specifically, certain embodiments of the invention relate to a method and system for channel quantization for multiuser diversity.

BACKGROUND OF THE INVENTION

Mobile communications have changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers.

In order to meet these demands, communication systems using multiple antennas at both the transmitter and the receiver have recently received increased attention due to their promise of providing significant capacity increase in a wireless fading environment. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to increase the degrees of freedom to suppress interference generated within the signal reception process. Diversity gains improve system performance by increasing received signal-to-noise ratio and by stabilizing the transmission link. On the other hand, more degrees of freedom may allow multiple transmissions that may provide more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

The widespread deployment of multi-antenna systems in wireless communications has been limited by the increased cost that results from increased size, complexity, and power consumption. This poses problems for wireless system designs and applications. As a result, some initial work on multiple antenna systems may be focused on systems that support single user point-to-point links. However, the use of multi-antenna techniques for a multiuser environment to improve total throughput remains a challenge.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for channel quantization for multiuser diversity, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1A:
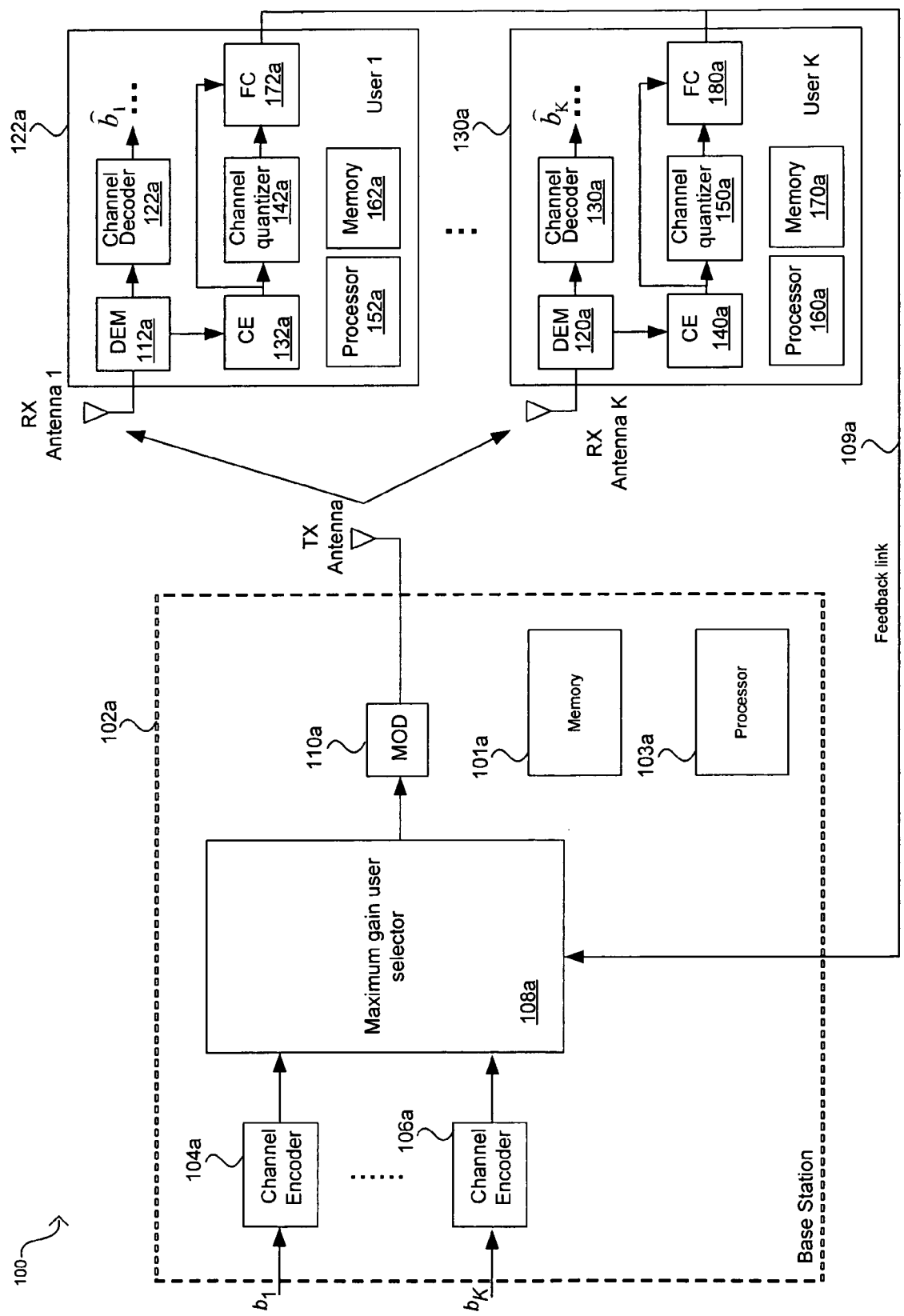
FIG. 1A is a top-level block diagram illustrating an exemplary multiuser downlink transmission system with feedback link, in accordance with an embodiment of the invention.

Certain embodiments of the invention may be found in a system and/or method for channel quantization for multiuser diversity. In accordance with various embodiments of the invention, a quantizer may utilize quantization levels determined based on an objective function J that corresponds to a performance metric for a finite-rate feedback multiuser downlink communication system. The quantization levels may be obtained based on the results of maximizing the objective function J by means of an optimization algorithm. The optimization algorithm may be a multivariate optimization algorithm that may be implemented utilizing an iterative approach. The quantizer may utilize the quantization levels to quantize channel state information (CSI) to achieve multiuser diversity in the finite-rate feedback multiuser system. Exemplary performance metric may comprise signal-to-noise ratio (SNR), bit error rate (BER), and/or system capacity. The quantization levels may be utilized in a multiuser system where distributed quantization is needed for optimal selection.

In wireless communication systems, reflection and scattering may cause multiple versions of the transmitted signal to arrive at a receiver. The constructive and destructive combination of these multipath signals may lead to significant fluctuation in the strength of the received signal, for example. This fluctuation may be referred to as multipath fading. One technique that has been developed to counter the effects of multipath fading is diversity, where multiple independent copies of the signal may be generated and reliable communication may be achieved as long as at least one of the signal copies is strong.

Diversity may be achieved in various ways, for example, by employing multiple antennas to create spatial diversity. In another example, a base station in a cellular communication system may transmit different data streams to multiple users. Because the users may each experience a different scattering environment, their multipath fading for each user may often be considered independent from that of other users. Therefore, the base station may select or choose to transmit to the strongest user to improve system performance such as error probability or throughput, for example. This form of diversity is called multiuser diversity.

In multiuser diversity applications, when both the base station and a receiver, such as a mobile unit, for example, are equipped with a single antenna, transmitting to the strongest user at one instance in time may result in achieving a maximum possible system throughput. Even in communication systems that employ multiple antennas, the use of multiuser diversity techniques may be adapted to improve system capacity.

Multiuser diversity techniques may require the base station or transmitter to know each of user's channel state information (CSI). For example, in frequency division duplexing (FDD) systems, the channel state information of each user may be estimated at the receiver side and may be fed back to the transmitter through a dedicated feedback link. Because of a rate limit on the feedback link, the CSI may have to be quantized at the receiver according to the rate limit before sending to the transmitter. In some instances, the design of multiuser systems with finite-rate feedback may be realized by utilizing algorithms that analytically quantify the performance of multiuser downlink transmission, that is, from the base station to several users with partial CSI at the base station, or transmitter, through finite rate feedback link from each user. In other instances, a scheduling algorithm may be utilized to achieve multiuser diversity with a very limited feedback rate.

FIG. 1A is a top-level block diagram illustrating an exemplary multiuser downlink transmission system with feedback link, in accordance with an embodiment of the invention. Referring to FIG. 1A, there is shown a communication system 100 that may comprise a base station 102a and a plurality of users 122a, . . . , 130a. The communication system 100 may correspond to a multiuser transmission system with TDMA user scheduling, for example. In the communication system 100, the base station 102a may be equipped with a single transmit antenna and K users 122a, . . . , 130a may each also have a single receive antenna. In some instances, the base station 102a may be equipped with multiple transmit antennas. The base station 102a may comprise a plurality of channel encoders 104a, . . . , 106a, a maximum gain user selector 108a, a modulator (MOD) 110a, a processor 101a, and a memory 103a. Each of the plurality of users 122a, . . . , 130a may comprise one of a plurality of demodulators (DEM) 112a, . . . , 120a, one of a plurality of channel decoders 122a, . . . , 130a, one of a plurality of channel estimators (CE) 132a, . . . , 140a, one of a plurality of channel quantizers 142a, . . . , 150a, and one of a plurality of feedback controllers (FC) 172a, . . . , 180a. Each of the plurality of users 122a, . . . , 130a may also comprise one of a plurality of processors 152a, . . . , 160a, and one of a plurality of memories 162a, . . . , 170a.

The channel encoders 104a, . . . , 106a may comprise suitable logic, circuitry, and/or code that may be adapted to encode binary data for each of the K users in the communication system 100. In this regard, the channel encoders 104a, . . . , 106a may encode the binary bit streams $b_1, \ldots, b_k$, respectively. The maximum gain user selector 108a may comprise suitable logic, circuitry, and/or code that may be adapted to select the binary bit stream from the user with the strongest channel gain to transmit. In this regard, the maximum gain user selector 108a may require knowledge of the gain of the downlink channel for each of the users 122a, . . . , 130a. In a frequency division duplex (FDD) system, the base station 102a may obtain the downlink channel state information (CSI) through a finite-rate feedback link 109a from the users. The channel state information received by the base station 102a may be referred to as CSI at the transmitter (CSIT). The modulator 110a may comprise suitable logic, circuitry, and/or code that may be adapted to modulate the binary bit stream that corresponds to the user selected by the maximum gain user selector 108a. In this regard, the modulation operation on the binary bit stream may result in a plurality of complex symbols, for example.

The processor 103a may comprise suitable logic, circuitry, and/or code that may be adapted to process information and/or data associated with the generation of transmission signals at the base station 102a. The processor 103a may also be adapted to control at least a portion of the operations of the base station 102a such as the channel encoders 104a, . . . , 106a, the maximum gain user selector 108a, the modulator 110a, and/or the memory 101a. The memory 101a may comprise suitable logic, circuitry, and/or code that may be adapted to store data and/or control information that may be utilized in the operation of at least a portion of the base station 102a.

The demodulators 112a, . . . , 120a in the users 122a, . . . , 130a may comprise suitable logic, circuitry, and/or code that may be adapted to demodulate the signals received from the base station 102a, for example. The channel decoders 122a, . . . , 130a may comprise suitable logic, circuitry, and/or code that may be adapted to decode the demodulated signals from the demodulators 132a, . . . , 140a into received binary bit streams $\hat{b}_1, \ldots, \hat{b}_k$, for example. The channel estimators 132a, . . . , 140a may comprise suitable logic, circuitry, and/or code that may be adapted to estimate channel state information for one or more receive channels. The channel quantizers 142a, . . . , 150a may comprise suitable logic, circuitry, and/or code that may be adapted to quantize channel state information estimated by the channel estimators 132a, . . . , 140a, respectively. In this regard, the channel quantizers 142a, . . . , 150a may utilize quantization levels that may be stored in the memories 162a, . . . , 170a. The quantization levels may be determined based on the feedback rate constraint of the communication system 100, the number of user in the system, the channel statistical distributions, and/or at least one performance metric that may be optimized, for example. The feedback controllers 172a, . . . , 180a may comprise suitable logic, circuitry, and/or code that may be adapted to select at least a portion of the channel state information generated by the channel quantizers 142a, . . . , 150a for transmission to the base station 102a via the feedback link 109a.

In operation, input signals $b_1, \ldots, b_k$ may be encoded by the channel encoders 104a, . . . , 106a. Based on the knowledge of the downlink channel state information received from the users 122a, . . . , 130a via the feedback link 109a, the maximum gain user selector 108a may select a users to transmit. The binary data of the selected user may be modulated by the modulator 110a. After the signal is transmitted from the single base station antenna and after it arrives at each of the users 122a, . . . , 130a, it may be demodulated and decoded into received binary bit streams $\hat{b}_1, \ldots, \hat{b}_k$.

Figure 1B:
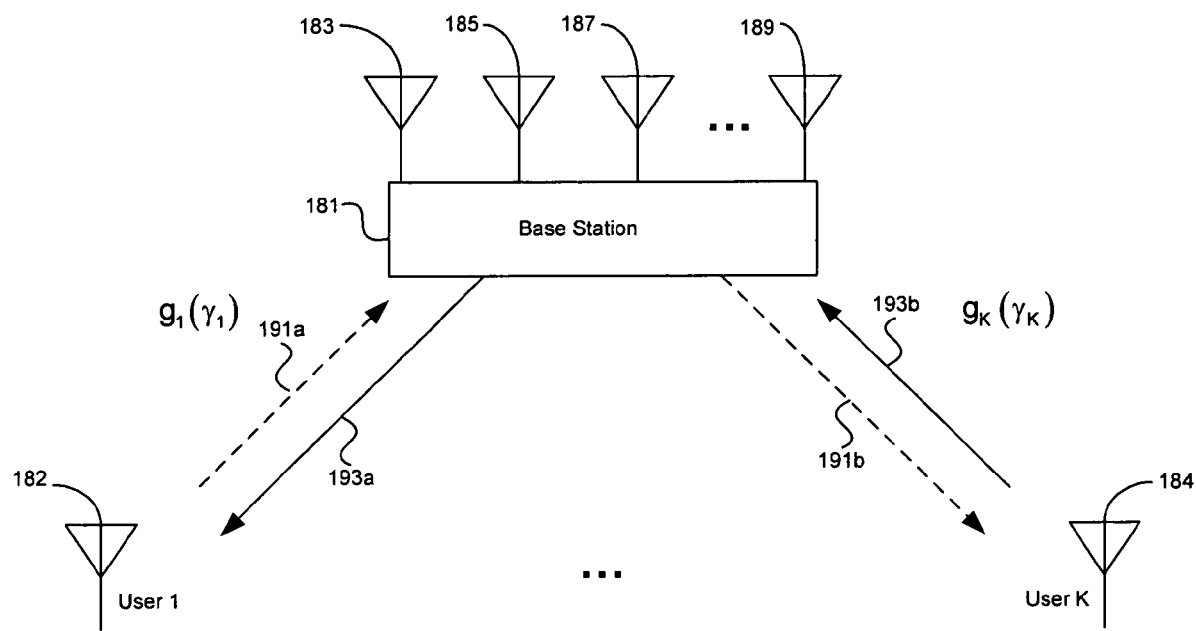
FIG. 1B is a diagram illustrating exemplary signal transmission from the base station to the receivers of FIG. 1B, in accordance with an embodiment of the invention.

FIG. 1B is a diagram illustrating exemplary signal transmission from the base station to the receivers of FIG. 1B, in accordance with an embodiment of the invention. There is shown a base station 181, a first user (user 1) 182, and a $K^{th}$ user (user K) 184, where K corresponds to the maximum number of users. In this instance, the base station 181 may comprise antennas 183, 185, 187, through 189. The base station 181 may be equipped with M ($M \geq 1$) antennas, for example. The operation of the base station 181 may be substantially similar to the operation of the base station 102a described in FIG. 1A. The operation of the first user 182 and the $K^{th}$ user 184 may be substantially similar to the operation of users 122a, . . . , 130a in FIG. 1A. In this regard, the first user 182 and the $K^{th}$ user 184 may each have a single antenna.

In this instance, the base station may have a communication link 193a with the first user 182 and a communication link 191b with the $K^{th}$ user 184. The link quality $\gamma_1$ of the first user 182 may be quantized into $g_1(\gamma 1)$ and may be fed back to the base station 181 through feedback link 191a. Similarly, link quality $\gamma_K$ of the $K^{th}$ user 184 may be quantized into $g_K$ ($\gamma K$) and may be fed back to the base station 181 through feedback link 193b.

Each of the K users in FIG. 1B may have knowledge of its own channel through accurate channel estimation, for example. In order to implement multiuser diversity at the base station 181, the effective signal-to-noise ratio (SNR) of each user, $\gamma_k|_{k=1}^{K}$ may be conveyed back to the base station 181 through a rate-constraint feedback link, such as the feedback link 109a in FIG. 1A. Therefore, the channel state information received by the base station 181 may be a quantized version of $\gamma_k$. The quantized version of the channel estate information may be represented by the expression:

$$g_k = Q(\gamma_k) \in C \triangleq \{n_1, n_2, \ldots, n_N\}, \quad (1)$$
$$k = 1, 2, \ldots, K,$$

where N is the total number of quantization levels such that $N=2^B$ and B is the user's feedback rate, in bits per channel update for example. Based on the feedback information $g_k$ from the users, the base station 181 may select the strongest user to communicate or transmit to based on the expression:

$$k_{sel} = \arg\max_{1 \leq k \leq K} g_k. \quad (2)$$

The overall performance of multiuser system with a finite-rate feedback may be given by the expression:

$$F = E_{\{\gamma_k\}|_{k=1}^{K}}[f(\gamma_{k_{sel}})] \quad (3)$$

where $f(\gamma_k)$ is a performance or optimization metric function that describes the link quality of the $\kappa^{th}$ user to the base station 181. For example, when system capacity is selected as the optimization objective or performance metric, then $f(\bullet)$ may be given by the expression:

$$f(\gamma) = \log_2(1 + \rho \cdot \gamma) \quad (4)$$

where $\rho$ is the average SNR.

Quantization of the channel state information may be performed by, for example, conventional scalar quantizers, with either uniform or non-uniform quantization schemes. A conventional scalar quantizer may represent a continuous value, for example $\gamma_k$, by a quantized discrete version $\hat{\gamma}_k$, such that the representation error $\tilde{\gamma}_k = \gamma_k - \hat{\gamma}_k$, or a function of $\tilde{\gamma}_k$ such as $\tilde{\gamma}_k|_2^r$, for example, is minimized. Conventional scalar quantizers may be limited in their ability to separate the strongest user from others through the quantization process. As a result of the finite quantization levels or regions that may result from the finite-rate feedback, utilizing a conventional scalar quantizer may result in more than one user being quantized into the same integer $n_i \epsilon C$. with high probability, and the transmitter may not able to select the strongest user or receiver to communicate in most situations and experience performance degradation.

Figure 2:
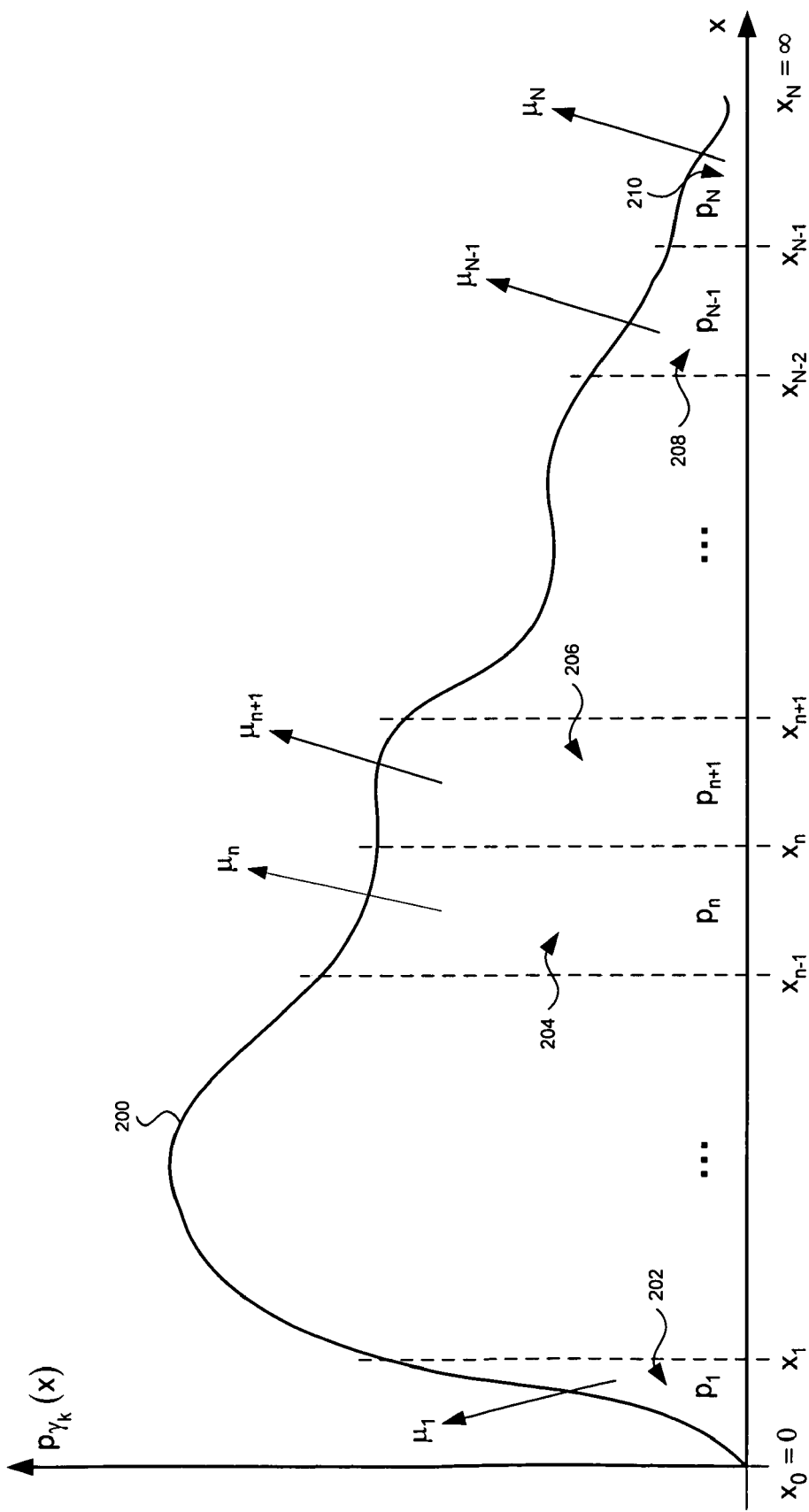
FIG. 2 is a diagram illustrating an exemplary probability density function (PDF) for performance metric f(γ), in accordance with an embodiment of the invention.

FIG. 2 is a diagram illustrating an exemplary probability density function (PDF) for performance metric $f(\gamma)$, in accordance with an embodiment of the invention. Referring to FIG. 2, there is shown a probability density function 200 given by $p_{\gamma_k}(x)$ that corresponds to a multiuser system with finite-rate feedback where the effective SNRs $\gamma_k$ for each of the K users may be independently and identically distributed (i. i. d.). A general optimization or performance metric function, $z_k = f(\gamma_k)$, may be selected as the design objective for the multiuser system that corresponds to the probability density function 200. In this regard, the performance metric function may be a monotonically increasing or decreasing function, for example. The performance metric to be optimized may be a system SNR, a bit-error-rate (BER), or a system capacity, for example. As shown in FIG. 2, the real axis (x-axis) may be partitioned partition by N+1 thresholds into N regions or levels 202, ..., 204. 206, ..., 208, and 210, each corresponding to one of the channel state information quantization levels. The partitioning thresholds, represented by $x_0, x_1, \ldots, x_N$, may be ordered as indicated by the following expression:

$$0 = x_0 < x_1 < \ldots < x_{N-1} < x_N = \infty. \tag{5}$$

A conditional mean $\mu_n$ of the metric function $z_k$ in the region $\gamma_k \in [x_{n-1}, x_n]$, may be given by the expression:

$$\mu_n = \frac{\int_{x_{n-1}}^{x_n} f(x) \cdot p_{\gamma_k}(x) dx}{\int_{x_{n-1}}^{x_n} dx} = \frac{\int_{x_{n-1}}^{x_n} f(x) \cdot p_{\gamma_k}(x) dx}{F_{\gamma_k}(x_n) - F_{\gamma_k}(x_{n-1})} \tag{6}$$

where $F_{\gamma_k}(x)$ is a cumulative distribution function (CDF) of the random variable $\gamma_k$. The value of equation (6) may be determined for each of the N regions 202, ..., 204. 206, ..., 208, and 210. Based on order statistics property, the CDF of the largest $\gamma_K$ from all K users may be given by the expression:

$$F_{\gamma_{max}}(x) = F_{\gamma_k}^K(x), \quad \gamma_{max} = \max_{1 \leq k \leq K} \gamma_k. \tag{7}$$

The probability that the strongest user falls within a region given by $\gamma_{max} \in [x_{n-1}, x_n]$ may be represented by:

$$p_n = F_{\gamma_{max}}(x_n) - F_{\gamma_{max}}(x_{n-1}) = F_{\gamma_k}^K(x_n) - F_{\gamma_k}^K(x_{n-1}). \tag{8}$$

In this regard, the value of equation (8) may be determined for each of the N regions 202, ..., 204. 206, ..., 208, and 210.

There may exist other users, in addition to the strongest one, that may fall into a quantization region $[x_{n-1}, x_n]$. As a result, the base station 181 in FIG. 1B may not able to determine the strongest user from the candidates available in the quantization region. The base station 181 may then pick one of the available users as the strongest user for the quantization region. The transmitter selection may be performed randomly, for example. In this case, the system performance may be determined by the conditional mean $\mu_n$, and overall system performance in terms of the metric $f(\gamma)$ may be given by the expression:

$$J = \sum_{n=1}^{N} p_n \cdot \mu_n = \sum_{n=1}^{N} \left( F_{\gamma_k}^K(x_n) - F_{\gamma_k}^K(x_{n-1}) \right) \cdot \mu_n, \tag{9}$$

where J is an objective function of the number of users K and the quantization thresholds $x_1, \ldots, x_{N-1}$ that correspond to the N regions or levels 202, ..., 204. 206, ..., 208, and 210 in FIG. 2. The objective function J may be represented by $J(K, x_1, \ldots, x_{N-1})$, for example.

Optimizing or maximizing the performance or objective function $J(\bullet)$ with respect to the quantization thresholds $x_1, \ldots, x_{N-1}$, may require the use of optimization algorithms since $J(\bullet)$ may be a highly multivariate non-convex or non-concave function with an unlimited domain, for example. When the probability distribution $p_{\gamma_k}(x)$ and the metric function $f(\gamma)$ are sufficiently smooth functions to be continuous, which may occur in most practical cases, conditions for the maximization of function $J(\bullet)$ may be expressed by:

$$\frac{\partial J(x_1, \ldots, x_{N-1})}{\partial x_n} = 0, \tag{10}$$

$$1 \leq n \leq N-1.$$

The conditions that result from equation (10) may be simplified and may be given by the expression:

$$f(x_n) = \mu_n + \alpha_n \cdot (\mu_{n+1} - \mu_n) \tag{11}$$

where $\alpha_n$ is a real coefficient such that $0 < \alpha_n < 1$, and $\alpha_n$ may be given by the expression:

$$\alpha_n = \frac{\frac{F_{\gamma_k}^K(x_{n+1}) - F_{\gamma_k}^K(x_n)}{F_{\gamma_k}(x_{n+1}) - F_{\gamma_k}(x_n)} - K \cdot F_{\gamma_k}^{K-1}(x_n)}{\frac{F_{\gamma_k}^K(x_{n+1}) - F_{\gamma_k}^K(x_n)}{F_{\gamma_k}(x_{n+1}) - F_{\gamma_k}(x_n)} - \frac{F_{\gamma_k}^K(x_n) - F_{\gamma_k}^K(x_{n-1})}{F_{\gamma_k}(x_n) - F_{\gamma_k}(x_{n-1})}}. \tag{12}$$

Figure 3:
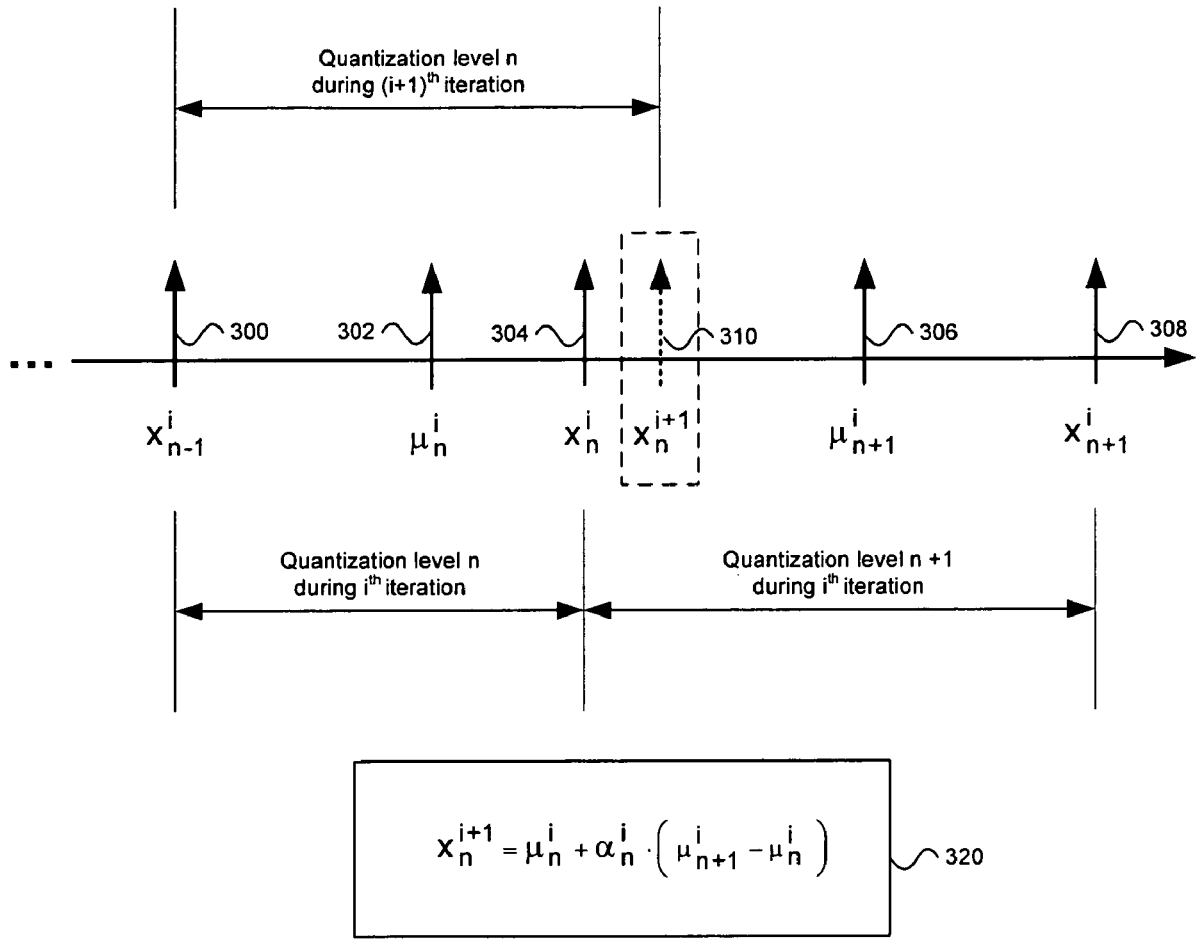
FIG. 3 is a diagram illustrating an exemplary quantization level iteration during maximization of the objective function J, in accordance with an embodiment of the invention.

FIG. 3 is a diagram illustrating an exemplary quantization level iteration during maximization of the objective function J, in accordance with an embodiment of the invention. Referring to FIG. 3, there are shown current partition thresholds 300, 304, and 308, an updated partition threshold 310, and an equation 320. Also shown are conditional means 302 and 205. In this instance, current partition thresholds 300 and 304, $x_{n-1}^i$ and $x_n^i$, may correspond to the lower and upper partition thresholds respectively for an $n^{th}$ quantization region during a current iterative step, or $i^{th}$ step, of an iterative optimization operation of the objective function J described in equation (9). The current partition thresholds 304 and 308, $x_n^i$ and $x_{n+1}^i$, may correspond to the lower and upper partition thresholds respectively for an $(n+1)^{th}$ quantization region during the $i^{th}$ step of the iterative optimization operation. The conditional means 302 and 306, $\mu_{n-1}^i$ and $\mu_{n+1}^i$, may correspond to the conditional means of the $n^{th}$ and $(n+1)^{th}$ quantization regions respectively. The updated partition threshold 310 may correspond to a value of the current partition threshold 304 during a next step, $(i+1)^{th}$, of the iterative optimization operation.

In this instance, the equation 320 shown in FIG. 3, $x_n^{i+1} = \mu_n^i + \alpha_n^i \cdot (\mu_{n+1}^i - \mu_n^i)$, may be utilized to determine the value of the updated partition threshold 310. Equation 320 may be based on the current value of the conditional means 302 and 306, and the current value of a current real coefficient $\alpha_n^i$, where $\alpha_n^i$ may be determined from the current value of the partition thresholds 300, 304, and 308 as shown in equation (9).

Figure 4:
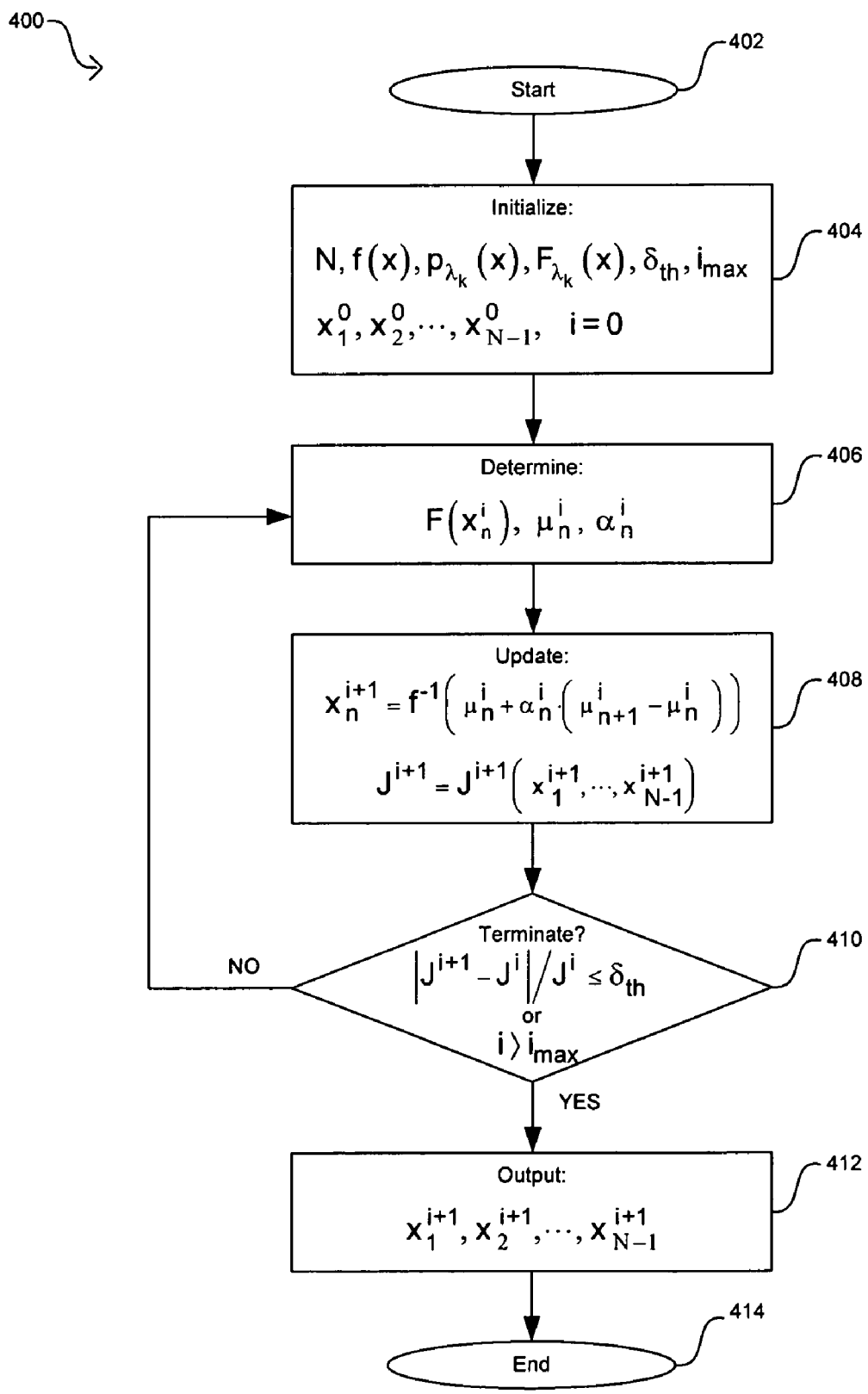
FIG. 4 is a flow diagram illustrating exemplary steps for iteratively determining quantization levels for a multiuser system with finite-rate feedback, in accordance with an embodiment of the invention.

FIG. 4 is a flow diagram illustrating exemplary steps for iteratively determining quantization levels for a multiuser system with finite-rate feedback, in accordance with an embodiment of the invention. Referring to FIG. 4, after start step 402, in step 404, an initialization operation may be performed for determining the quantization levels. In this regard, a multiuser communication system with K users may use a CSI quantizer with N quantization levels for the finite-rate feedback, where $N = 2^B$. The effective received SNR at each user may be independently and identically distributed (i. i. d.) with probability density function $p_{\gamma_k}(x)$ or cumulative distribution function $F_{\gamma_k}(x)$. The initialization operation in step 404 may comprise randomly picking N−1 real positive values and assigning them to the partition thresholds $x_1^0, \ldots, x_{N-1}^0$. The partition thresholds may be ordered such that $0=x_0^0<x_1^0<\ldots<X_{N-1}^0<x_N^0=\infty$, for example. An objective convergence threshold, $\delta_{th}$, and a maximum iteration number, $i_{max}$, may be selected. An iteration index i may be set to 0, for example.

In step 406, the cumulative distribution function, $F_{\gamma_k}(x_n^i)$, the conditional means, $\mu_n^i$, and the real coefficient, $\alpha_n^i$ may be determined for the current iteration step, or $i^{th}$ iteration. The conditional mean and the real coefficient are functions of the current values of the partition thresholds, $x_1^i, \ldots, x_{N-1}^i$, and may be given by the following expressions:

$$\mu_n^j = \frac{\int_{x_{n-1}^j}^{x_n^j} f(x) \cdot p_{\gamma_k}(x)\,dx}{F_{\gamma_k}(x_n^j) - F_{\gamma_k}(x_{n-1}^j)}, \tag{13}$$

$$\alpha_n^j = \frac{\dfrac{F_{\gamma_k}^K(x_{n+1}^j) - F_{\gamma_k}^K(x_n^j)}{F_{\gamma_k}(x_{n+1}^j) - F_{\gamma_k}(x_n^j)} - K \cdot F_{\gamma_k}^{K-1}(x_n^j)}{\dfrac{F_{\gamma_k}^K(x_{n+1}^j) - F_{\gamma_k}^K(x_n^j)}{F_{\gamma_k}(x_{n+1}^j) - F_{\gamma_k}(x_n^j)} - \dfrac{F_{\gamma_k}^K(x_n^j) - F_{\gamma_k}^K(x_{n-1}^j)}{F_{\gamma_k}(x_n^j) - F_{\gamma_k}(x_{n-1}^j)}}. \tag{14}$$

In step 408, the values of the partition thresholds, that is, the quantization levels, may be updated based on the results from step 406. In this regard, the new partition thresholds $x_1^{i+1}, \ldots, x_{N-1}^{i+1}$ for the $(i+1)^{th}$ iteration may be updated by utilizing the following expression:

$$x_n^{i+1} = f^{-1}(\mu_n^i + \alpha_n^i \cdot (\mu_{n+1}^i - \mu_n^i)). \tag{15}$$

Correspondingly, the objective function J, as given by equation (9), may also be updated based on the results of equation (15) by the expression:

$$J^{i+1} = \sum_{n=1}^{N} \left(F_{\gamma_k}^K(x_n^{i+1}) - F_{\gamma_k}^K(x_{n-1}^{i+1})\right) \cdot \mu_n^{i+1}. \tag{16}$$

In step 410, the iterative updating process may be terminated when the relative increment of the objective function, that is, $J^{i+1} - J^i$, compared to that of a previous iteration, may be less than the convergence threshold, as given by the following expression:

$$\frac{|J^{i+1} - J^i|}{J^i} \leq \delta_{th}, \tag{17}$$

or when the maximum number of iterations has been reached, such that:

$$i > i_{max}. \tag{18}$$

When neither the condition in equation (17) nor the condition in equation (18) is satisfied, the iterative updating process for the optimization of the objective function J may continue and the process may proceed to step 408 and the iteration number may be increased by one, that is, i=i+1. When at least one of the conditions in equations (17) and (18) is satisfied, the process may proceed to step 412.

In step 412, upon reaching convergence by satisfying at least one of the conditions in equations (17) and (18), the most recently determined quantization levels $x_1^{i+1}, \ldots, x_{N-1}^{i+1}$ from step 408 may be selected for use by a quantizer in a multiuser system with finite-rate feedback. In this regard, different sets of quantization levels may be determined for a plurality of performance metrics, such as, SNR, BER, or system capacity, for example. Each of these sets may be stored in memory in a receiver of the multiuser system, such as memories 162a, . . . , 170a in FIG. 1A. The processors 152a, . . . , 160a in the K users in the multiuser system may be utilized to select an appropriate set of quantization levels from the memories 162a, . . . , 170a and may transfer those values to the channel quantizers 142a, . . . , 150a, for example.

The approach described herein for generating a set of quantization levels in a multiuser system with finite-rate feedback based on a selected performance metric may be utilized for a communication system where the base station, such as base station 102a in FIG. 1A, may have one transmit antenna (M=1) and there may be a total of K users, such as users 122a, . . . , 130a, in the system, for example. In this regard, each user may have one receive antenna and may experience an i. i. d., zero-mean unit-variance complex Gaussian distributed fading. In this instance, the effective received SNR $\gamma_k$ for each user may have an exponential distribution with unit mean such that the PDF function may be given by the expression:

$$p_{\gamma_k}(x) = \exp(-x). \tag{19}$$

When the effective SNR is selected as the design objective, that is, as the performance or optimization metric, the metric function f(•) may be given by the expression:

$$f(\gamma_k) = \rho \cdot \gamma_k, \tag{20}$$

where each user may have the same average SNR, $\rho$. From equation (20), the following expressions may be obtained:

$$F_{\gamma_k}(x) = 1 - e^{-x},\ \mu_n = 1 + \frac{x_{n-1} \cdot e^{-x_{n-1}} - x_n \cdot e^{-x_n}}{e^{-x_{n-1}} - e^{-x_n}}. \tag{21}$$

Substitution equation (21) into equation (15) may provide an iterative design algorithm to generate the quantization levels that may be utilized by quantizers in a multiuser system with finite-rate feedback to maximize the effective SNR.

Figure 5:
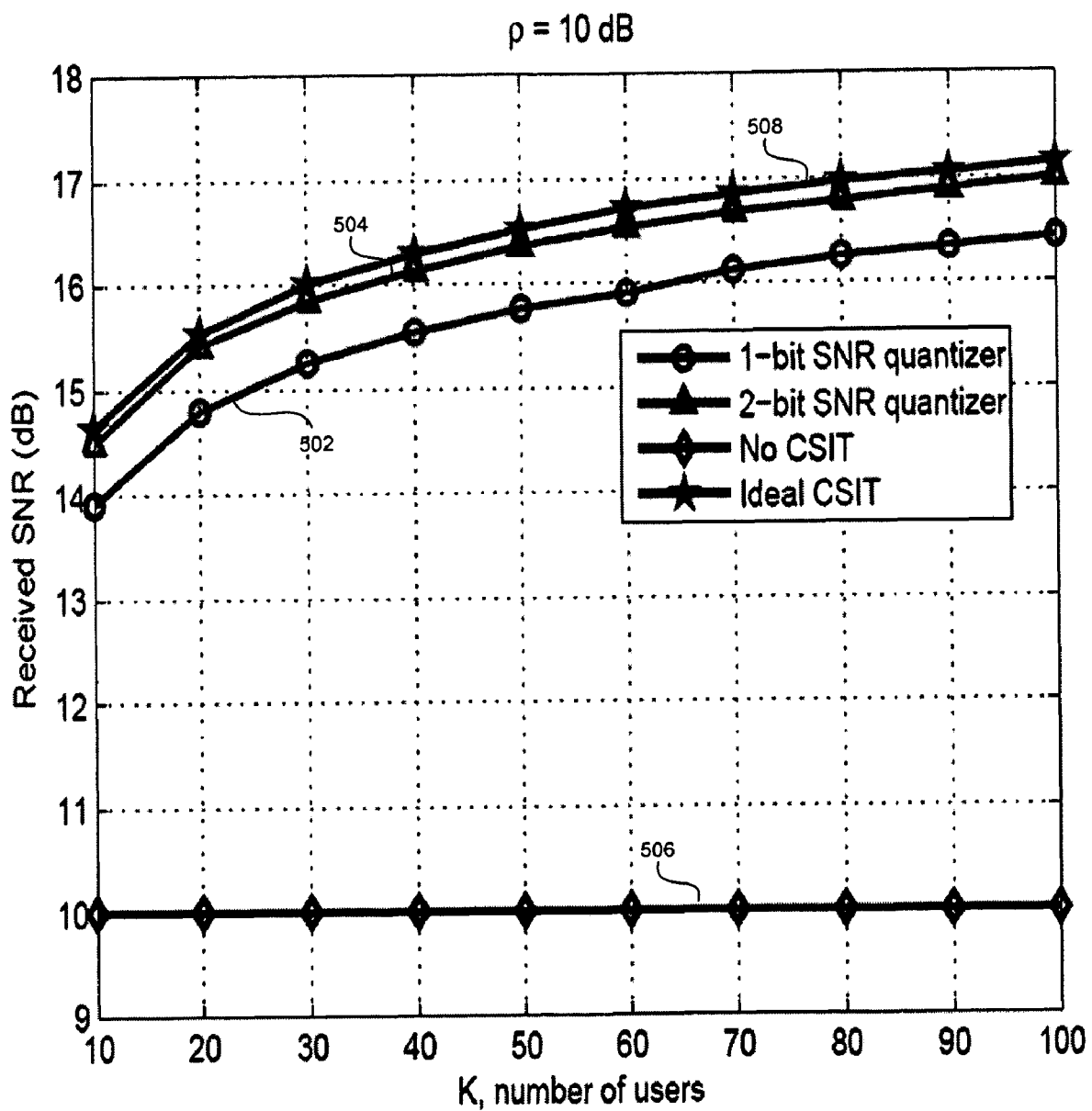
FIG. 5 is a graph that illustrates system effective SNR with respect to number of users K for no CIST, ideal CIST, and 1-bit and 2-bit quantizer with SNR as performance metric, in accordance with an embodiment of the present invention.

FIG. 5 is a graph that illustrates system effective SNR with respect to number of users K for no CIST, ideal CIST, and 1-bit and 2-bit quantizer with SNR as performance metric, in accordance with an embodiment of the present invention. Referring to FIG. 5, there are shown results of a numerical simulation for SNR ($\rho$=10) for various feedback link quality as a function of the number K of users in the system. The system may utilize different feedback rates, such as B=1 or 2 bits per channel update, for example. Four results are provided as illustrated by signals 502, 504, 506, and 508. The signal 502 may correspond to an instance when 1-bit per channel update may be utilized in the feedback link and the channel quantization levels are determined based on the approach described herein for SNR as the performance metric. The signal 504 may correspond to an instance when 2-bits per channel update may be utilized in the feedback link and the channel quantization levels are determined based on the approached described herein for SNR as the performance metric. The signal 506 may correspond to an instance when no information regarding the channel state information is available at the transmitter (CSIT). The signal 508 may correspond an instance when ideal or perfect information of the CSIT is available. These results indicate that signals 502 and 504 corresponding to B=1 and B=2 bits per channel update respectively, provide an overall performance that is comparable to the ideal CSIT case.

Figure 6:
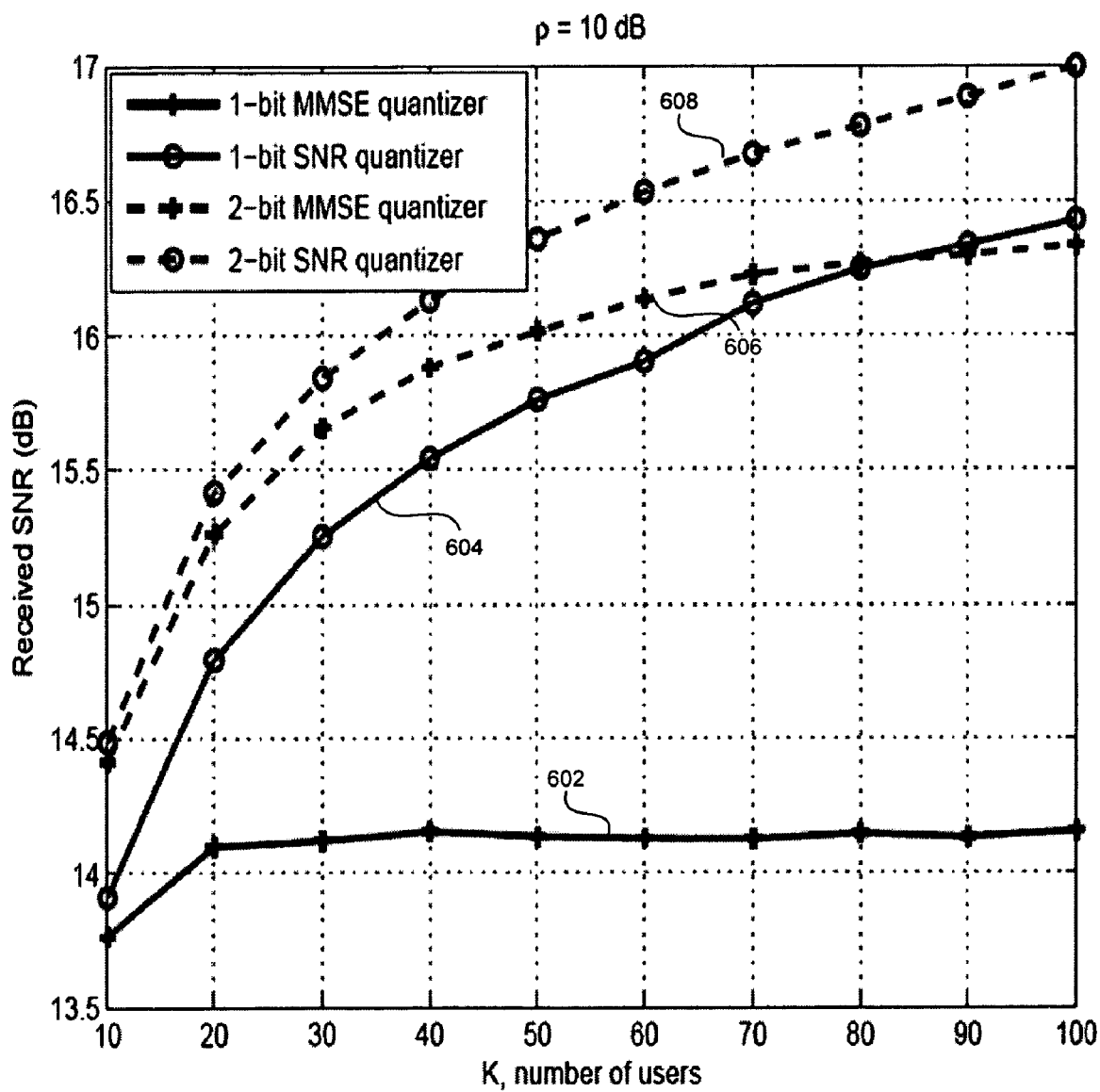
FIG. 6 is a graph that illustrates system effective SNR with respect to number of users K for 1-bit and 2-bit minimum mean-squared error (MMSE) quantizer, and 1-bit and 2-bit quantizer with SNR as performance metric, in accordance with an embodiment of the present invention.

FIG. 6 is a graph that illustrates system effective SNR with respect to number of users K for 1-bit and 2-bit minimum mean-squared error (MMSE) quantizer, and 1-bit and 2-bit quantizer with SNR as performance metric, in accordance with an embodiment of the present invention. Referring to FIG. 6, there are shown results of a numerical simulation for SNR ($\rho$=10) for various quantizers as a function of the number K of users in the system. The system may utilize different feedback rates, such as B=1 or 2 bits per channel update, for example. Four results are provided as illustrated by signals 602, 604, 606, and 608. The signal 602 may correspond to the performance of an MMSE quantizer when B=1 bit per channel update. In this regard, the MMSE quantizer is a scalar quantizer that minimizes the mean square quantization error. The signal 604 may correspond to the performance of a quantizer that utilizes channel quantization levels determined based on the approach described herein for SNR as the performance metric and B=1 bit per channel update. The signal 606 may correspond to the performance of an MMSE quantizer when B=2 bits per channel update. The signal 608 may correspond to the performance of a quantizer that utilizes channel quantization levels determined based on the approach described herein for SNR as the performance metric and B=2 bits per channel update. These results indicate that, at B=2 bits per channel update, the quantizer that utilizes quantization levels optimized for SNR as the optimization metric may have a higher received SNR than the MMSE quantizer.

Certain embodiments of the invention may comprise a machine-readable storage having stored thereon, a computer program having at least one code section for processing signals in a communication system. In this regard, the at least one code section may be executable by a machine for causing the machine to perform steps comprising determining and/or utilizing channel quantization levels for multiuser diversity system with finite-rate feedback.

The use of quantization levels determined based on an objective function J that corresponds to a performance metric for a finite-rate feedback multiuser downlink communication system may be adapted, at least in part, to a standard and/or a communication protocol. The approach described herein need not be limited to wireless systems nor to finite-rate systems. For example, the feedback link may be dynamic and the quantization levels utilized by a quantizer may be modified in accordance to a current feedback rate. Moreover, other performance metrics that may be utilized by certain embodiments of the invention may comprise signal-to-interference-and-noise ratio (SINR), SNR per bit, SNR per symbol, maximum burst capacity, or symbol error rate, for example.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
maximizing a function J corresponding to a metric in a multiuser system with finite-rate feedback, wherein said function J generates a sum over a range n=1 to N of a product of $\mu_n$ and $p_n$, where n corresponds to a current quantization level, $\mu_n$ is a conditional mean corresponding to said metric and $p_n$ is a probability that one of a plurality of receivers in said multiuser system comprises a signal-to-noise ratio (SNR) that is in an $n^{th}$ quantization interval $[x_{n-1}, x_n]$, where $x_{n-1}$ is a first partitioning threshold for said $n^{th}$ quantization interval, and $x_{n-1}$ is a second partitioning threshold for said $n^{th}$ quantization interval; and
determining quantization levels to be utilized by a quantizer in said multiuser system with finite-rate feedback based on said maximized function J.

2. The method according to claim 1, wherein said probability $p_n$ is defined by the following expression:

$$p_n = \left(F_{\gamma_k}^K(x_n) - F_{\gamma_k}^K(x_{n-1})\right)$$

where K is a total number of said plurality of receivers, k is an index that indicates a current of said plurality of receivers, $\gamma_k$ is a signal-to-noise ratio (SNR) corresponding to each of said plurality of receivers, and $F_{\gamma_k}^K(x)$ is a cumulative distribution function of the largest of said SNR corresponding to each of said plurality of receivers.

3. The method according to claim 1, comprising maximizing said function J based on an algorithm that converges to a specified threshold.

4. The method according to claim 3, wherein said algorithm is a multivariate optimization algorithm.

5. The method according to claim 3, wherein said algorithm is an iterative algorithm.

6. The method according to claim 1, wherein said metric is a signal-to-noise ratio (SNR).

7. The method according to claim 1, wherein said metric is a bit-error-rate (BER).

8. The method according to claim 1, wherein said metric is a system capacity.

9. The method according to claim 1, comprising storing said determined quantization levels in said plurality of receivers in said multiuser system.

10. The method according to claim 9, further comprising dynamically selecting at least a portion of said stored determined quantization levels in said plurality of receivers based on said metric.

11. A system for processing signals in a communication system, the system comprising:
a multiuser system with finite-rate feedback comprising a plurality of receivers;
each of said plurality of receivers comprises a quantizer; and
said quantizer is operable to determine quantization levels based on maximizing a function J corresponding to a metric in said multiuser system with finite-rate feedback, wherein said function J generates a sum over a range n=1 to N of a product of $\mu_n$ and $p_n$, where n corresponds to a current quantization level, $\mu_n$ is a conditional mean corresponding to said metric and $p_n$ is a probability that one of the plurality of receivers in said multiuser system comprises a signal-to-noise ratio (SNR) that is in an $n^{th}$ quantization interval $[x_{n-1}, x_n]$, where $x_{n-1}$ is a first partitioning threshold for said $n^{th}$ quantization interval, and $x_n$ is a second partitioning threshold for said $n^{th}$ quantization interval.

12. The system according to claim 11, wherein said probability $p_n$ is defined by the following expression:

$$p_n = \left( F_{\gamma_k}^K(x_n) - F_{\gamma_k}^K(x_{n-1}) \right)$$

where K is a total number of said plurality of receivers, k is an index that indicates a current of said plurality of receivers, $\gamma_k$ is a signal-to-noise ratio (SNR) corresponding to each of said plurality of receivers, and $$F_{\gamma_k}^K(x)$$

is a cumulative distribution function of the largest of said SNR corresponding to each of said plurality of receivers.

13. The system according to claim 11, wherein said function J is maximized based on an algorithm that converges to a specified threshold.

14. The system according to claim 13, wherein said algorithm is a multivariate optimization algorithm.

15. The system according to claim 13, wherein said algorithm is an iterative algorithm.

16. The system according to claim 11, wherein said metric is a signal-to-noise ratio (SNR).

17. The system according to claim 11, wherein said metric is a bit-error-rate (BER).

18. The system according to claim 11, wherein said metric is a system capacity.

19. The system according to claim 11, wherein each of said plurality of receivers comprises a memory that stores said determined quantization levels.

20. The system according to claim 19, wherein each of said plurality of receivers comprises a processor that dynamically selects at least a portion of said stored determined quantization levels.

* * * * *